Figure 8:
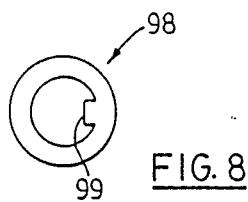

United States Patent [19]

Armstrong et al.

[11] Patent Number: 4,874,143
[45] Date of Patent: Oct. 17, 1989

[54] TAPE CASSETTE HAVING REWIND CONTROL MECHANISM

[75] Inventors: Richard J. Armstrong; Robert Granzotto, both of Toronto, Canada

[73] Assignees: Arena Recreations (Toronto) Limited; William L. Heisey, both of Toronto, Canada

[21] Appl. No.: 204,564

[22] Filed: Jun. 9, 1988

[51] Int. Cl.$^4$ ............................................. G11B 23/087
[52] U.S. Cl. .................................... 242/198; 242/71.8
[58] Field of Search ...................... 242/71.8, 197–200; 360/132

[56] References Cited

U.S. PATENT DOCUMENTS 4,447,020  5/1984  Toi et al. ............................. 242/198
4,512,535  4/1985  Dickson et al. ................. 242/201 X
4,702,434 10/1987  Braver ............................. 242/199 X Primary Examiner—David Werner

[57] ABSTRACT

A tape cassette which has a limited access rewind system includes a one-way coupling arranged to communicate between the spool and the rewind mechanism. The one-way coupling mechanism includes an engagement disc which is mounted in the housing and forms a part of the take-up spool. The one-way coupling device serves to engage automatically to prevent rotation of the spool relative to the engagement member in the unwinding direction and to release automatically to permit free rotation of the spool in the winding direction. A locking mechanism is located in the housing which is operable to secure the engagement member against rotation and thereby prevent rotation of the spool in the take-up direction. The locking mechanism may be released to disengage the engaging member to permit free rotation of the engagement member and spool about the take-up access. The tape cassette also includes a releasable latching mechanism which serves to lock each spool against rotation during shipping and handling.

8 Claims, 9 Drawing Sheets

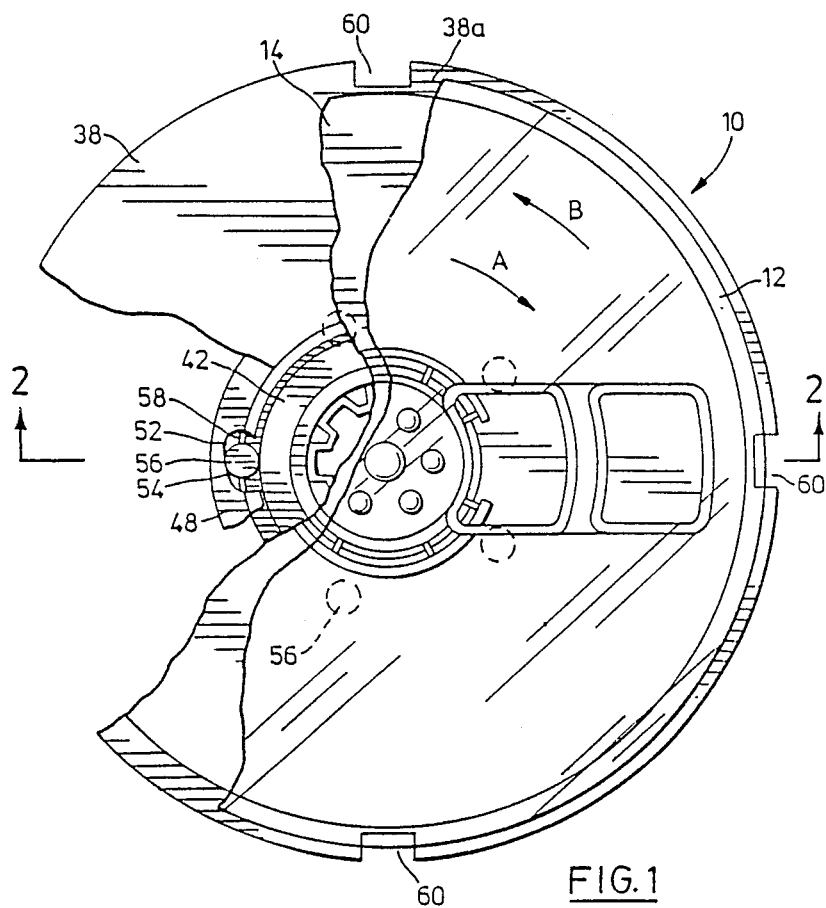
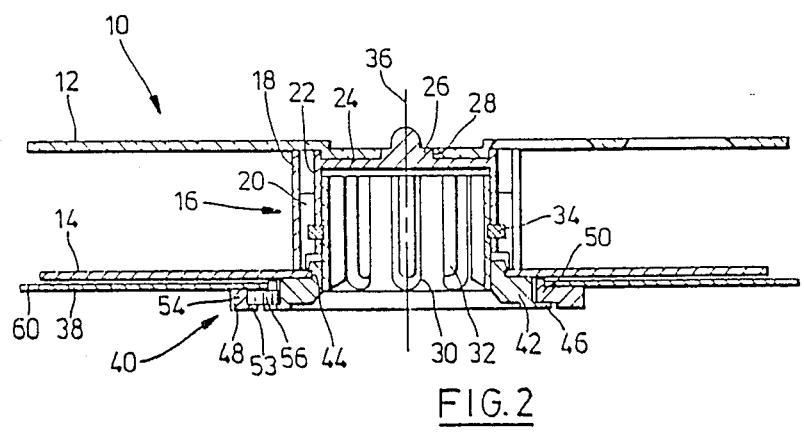

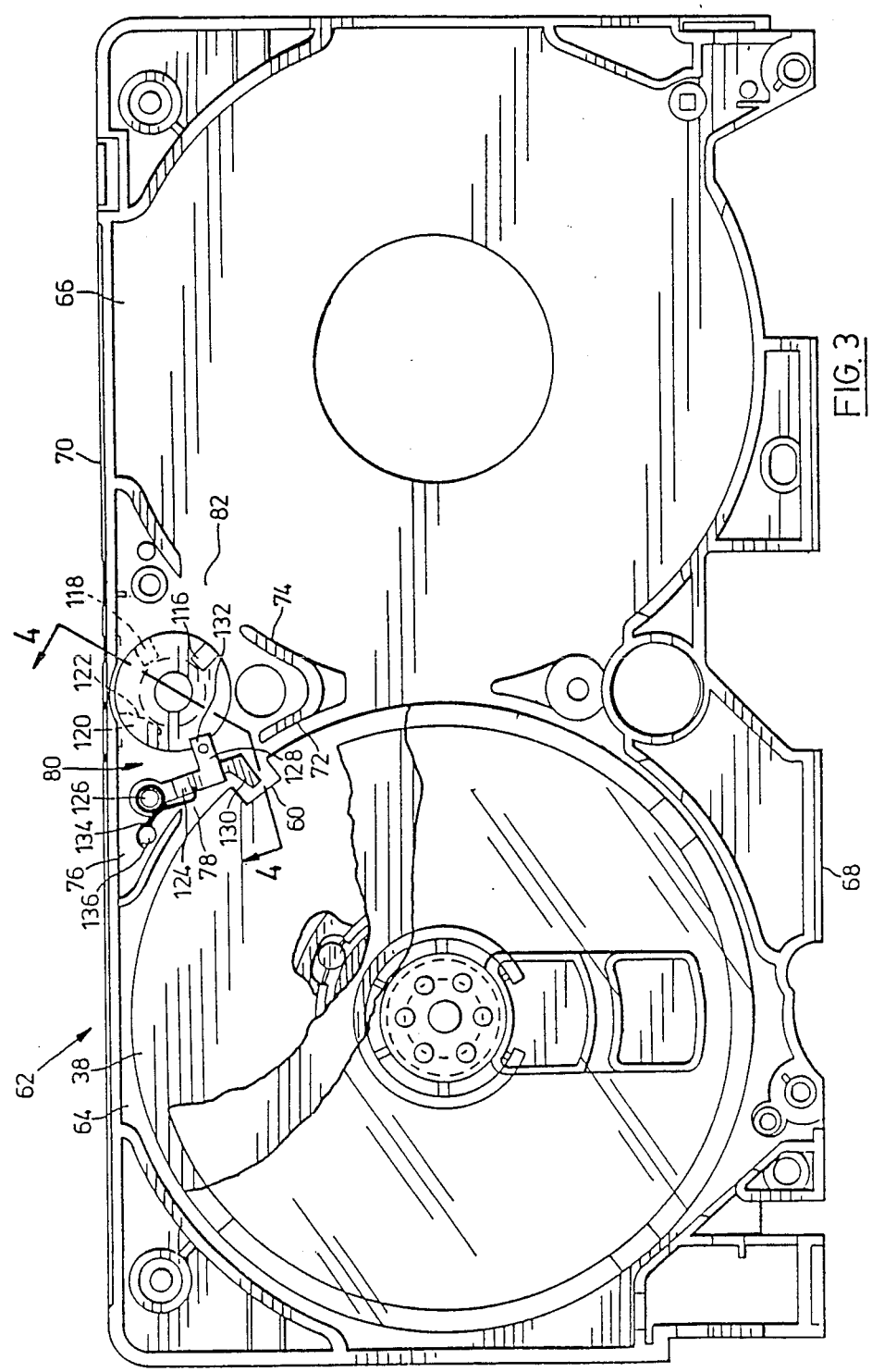

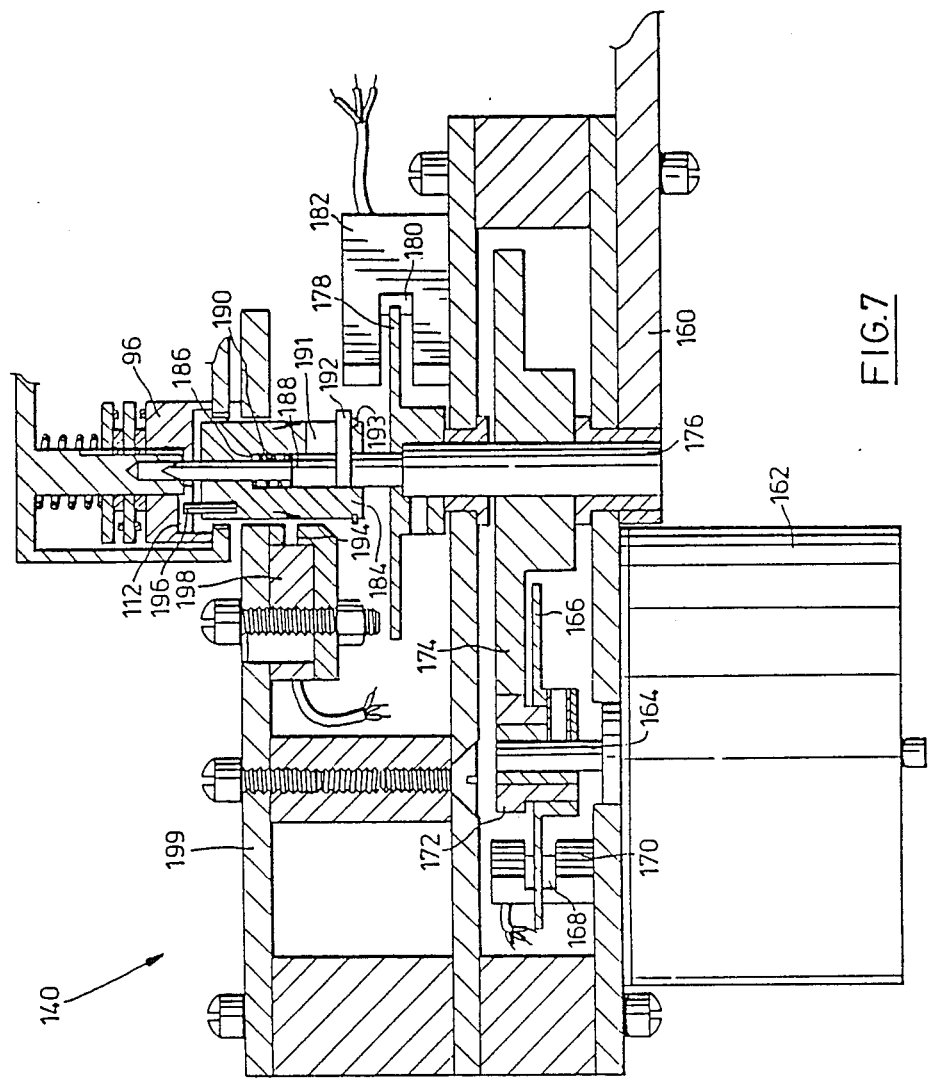

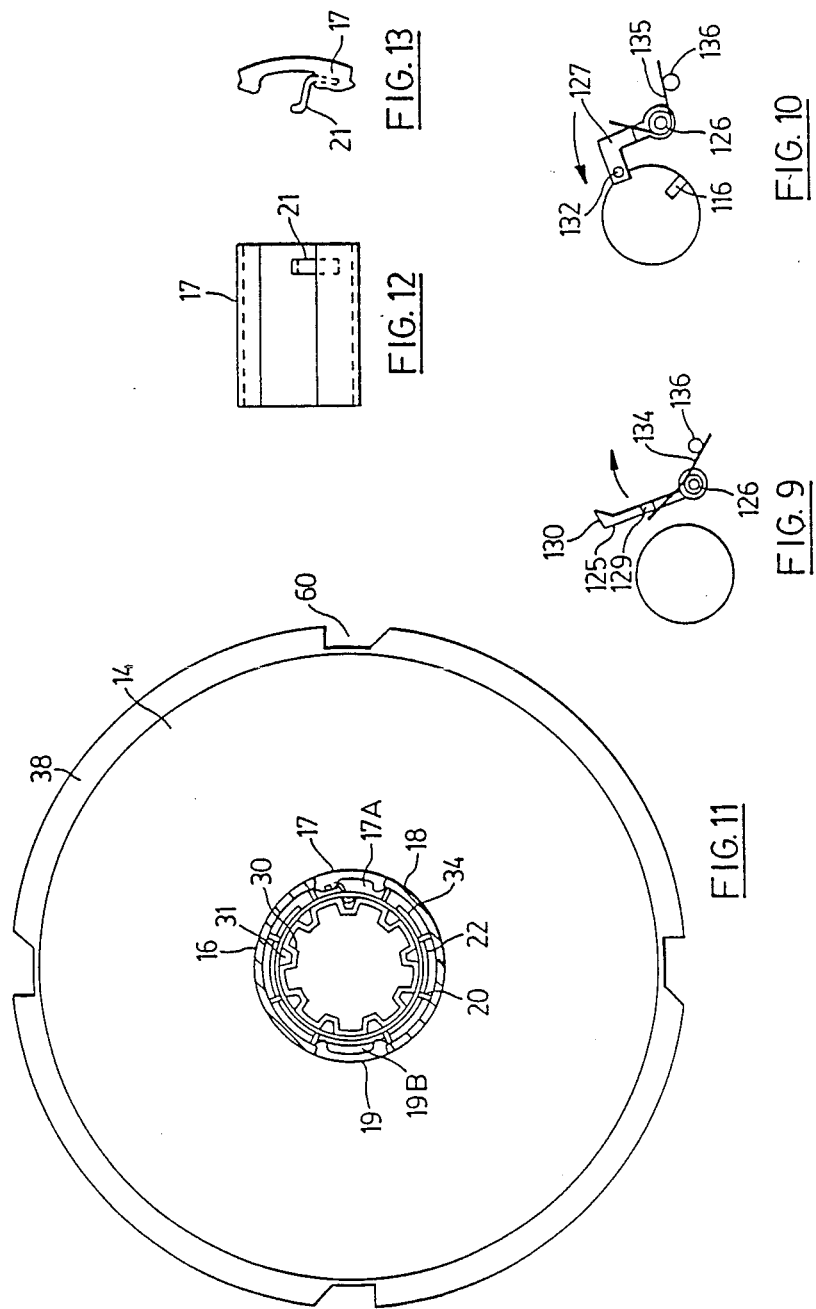

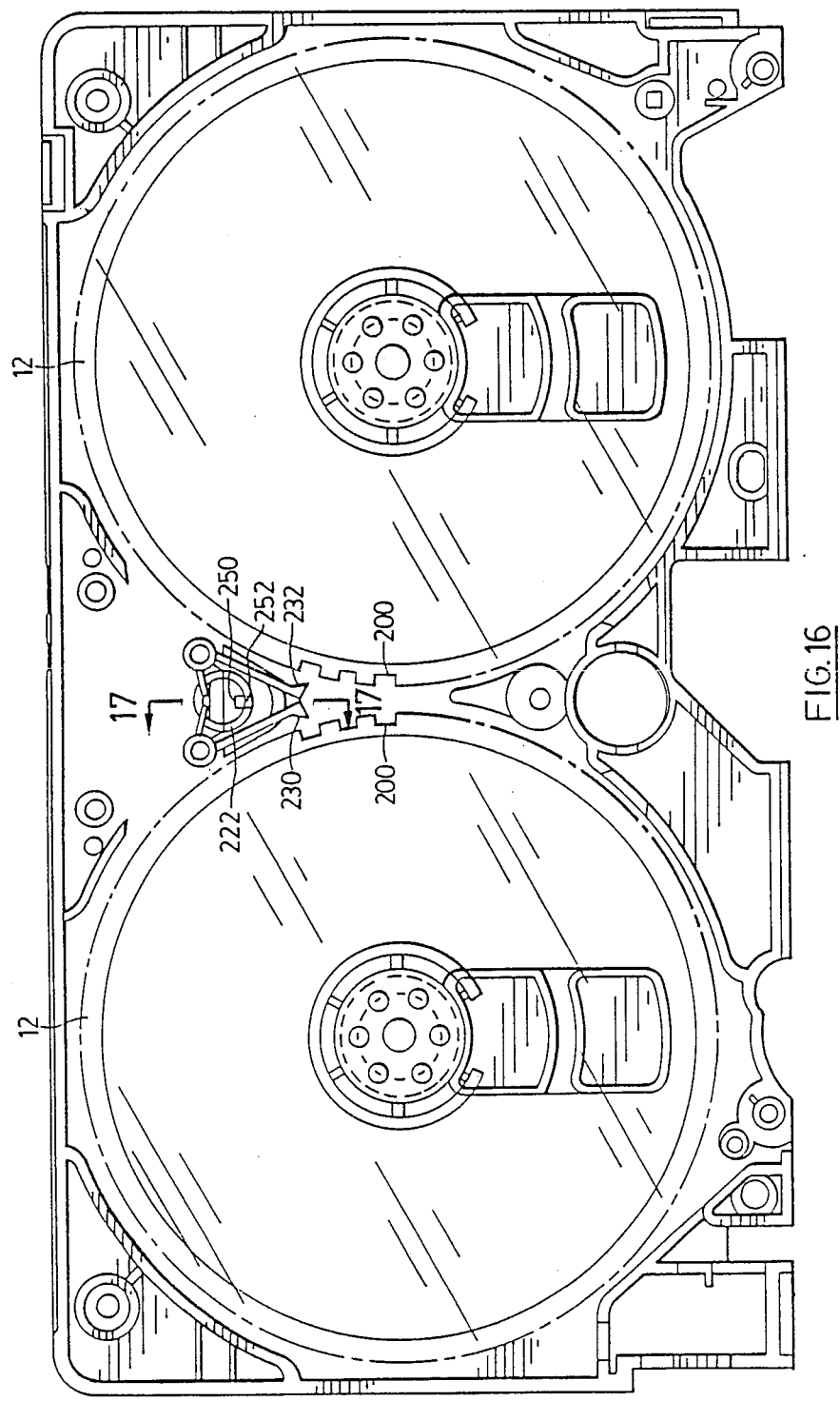

TAPE CASSETTE HAVING REWIND CONTROL MECHANISM

This invention relates to tape cassettes. In particular, the invention relates to a tape cassette which has a controlled access rewinding mechanism.

PRIOR ART

In my prior U.S. Pat. No. 4,512,535 there is disclosed a tape cassette which has a limited access rewind system. In my prior system, I provide a one-way roller clutch which can be released to permit rewinding by displacing selected rollers. While this mechanism works effectively, it requires a sophistocated release mechanism to displace the selected rollers to effectively disengage the clutch.

I have found that it is possible to provide a controlled access rewind system which avoids the use of a releaseable clutch by employing a one-way coupling and releaseable locking mechanism. The releaseable locking mechanism cooperates with the one-way coupling to achieve the same result as that previously achieved by the releaseable clutch. The locking mechanism is, however, easier to operate and requires a less sophisticated operating mechanism.

It is common practice to provide a mechanism which will serve to retain the spools against rotation during shipping and handling. This mechanism includes a series of notches formed along the peripheral edge of the lower side wall of the spool and a latch mechanism which will engage these notches to prevent rotation of the spool. This latch mechanism is disengaged by a rod which is incorporated into a VCR which will extend through the bottom wall of the housing and will engage the latch members to move them out of engagement with the spools. This structure cannot be used in a tape cassette of the type of the present invention in which the lower side wall of the spool acts as an engagement member for engaging a one-way clutching mechanism. We have found that it is possible to overcome this difficulty by forming the locking notches on the upper side wall of each spool and providing a latching mechanism which is activated by the conventional movable rod of the VCR which will serve to move latching arms into and out of engagement with the notches which are formed in the upper side walls of the spools.

SUMMARY OF INVENTION

It is an object of the present invention to provide a limited access rewind mechanism in a tape cassette which is simple to operate.

It is a further object of the present invention to provide a tape cassette in which the take-up spool incorporates an engagement member which when held stationary serves to limit the rotation of the take-up spool to winding in the take-up direction and which when released, frees the take-up spool for rotation in the rewind direction.

According to one aspect of the present invention there is provided in a tape cassette having a housing and a pair of spools located in the housing, a first of said spools being a take-up spool which is mounted in the housing for rotation about its axis in a first direction to take-up and a second direction to unwind a tape or the like from or onto the other spool, the improvement of an engagement member mounted in the housing for rotation about the axis of the take-up spool, a one-way coupling means arranged to communicate between the engagement member and the take-up spool, said coupling means engaging automatically to prevent rotation of the spool relative to the engagement member in the rewind direction and releasing automatically to permit free rotation of the spool relative to the engagement member in the winding direction, locking means in said housing, said locking means being operable to selectively engage said engagement member to secure it against rotation about said take-up axis and thereby prevent rotation of the take-up spool as a result of the automatic engagement of the coupling when an attempt is made to rotate the take-up spool relative to the engagement member in the first direction and to disengage the brake member to permit free rotation of the brake member and spool about said second axis to allow the spool to be rewound.

According to a further aspect of the present invention, there is provided in a tape cassette of the type described above, a third compartment located between the back edge of the cassette and said converging side wall portions of the spool mounting compartments, a locking passage opening from said third compartment through a first of said converging side wall portions into the spool mounting compartment in which the take-up spool is located, said locking means being mounted in said third compartment and having a detent which is mounted for movement through said locking passage into and out of engagement with said engagement member.

According to a still further aspect of the present invention there is provided in a tape cassette of the type having a housing, a pair of spool locating compartments located in the housing in a side-by-side relationship and a third compartment located between the converging sides of the spool compartments and an adjacent side wall of the hosing, each spool having an upper and lower circular side wall located adjacent the upper and lower walls of the housing respectively, the improvement of a plurality of notches formed in the outer peripheral edge of the upper side wall of each spool at circumferentially spaced intervals, a slide member slidably mounted in said third compartment for movement along a guide path between a lowered position and a raised position with respect to the bottom wall of the housing, a pair of latching arms, one associated with each spool, each latching arm being pivotally mounted in said third compartment for movement between a first position in which it is seated in a notch of its associated spool to lock the spool against rotation and a second position in which it is out of engagement with its associated spool, an actuator lever arm projecting from each latching arm for movement with its associated latching arm between first and second positions in response to movement of the latching arms between their first and second positions, said actuator lever arms extending into said guide path, a ramp face on said slide member, said ramp face being arranged to engage said actuator lever arms as said slide member is driven to and fro between said lowered position and said raised position to move said actuator lever arms to and fro between their first and second positions and thereby moving their associated latching arms to and fro between their first and second positions to latch their associated spool against rotation and to release their associated spool for rotation as required in use.

PREFERRED EMBODIMENT

Figure 4:
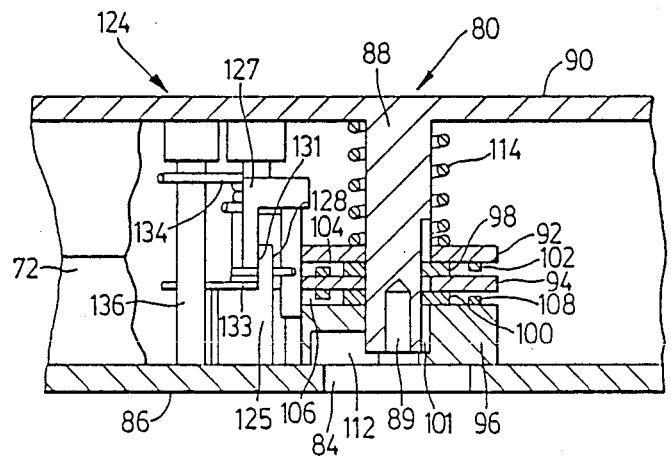
Figure 5:
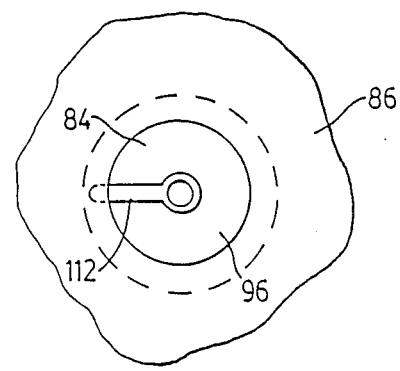
Figure 6:
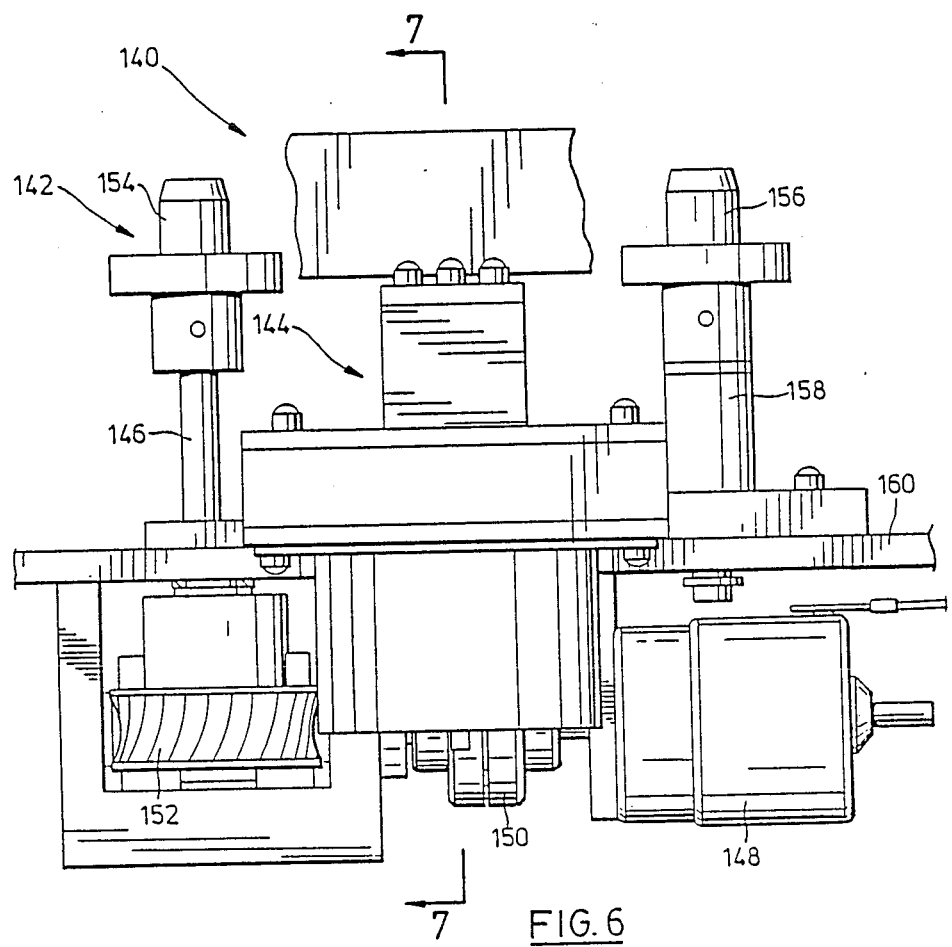
Figure 14:
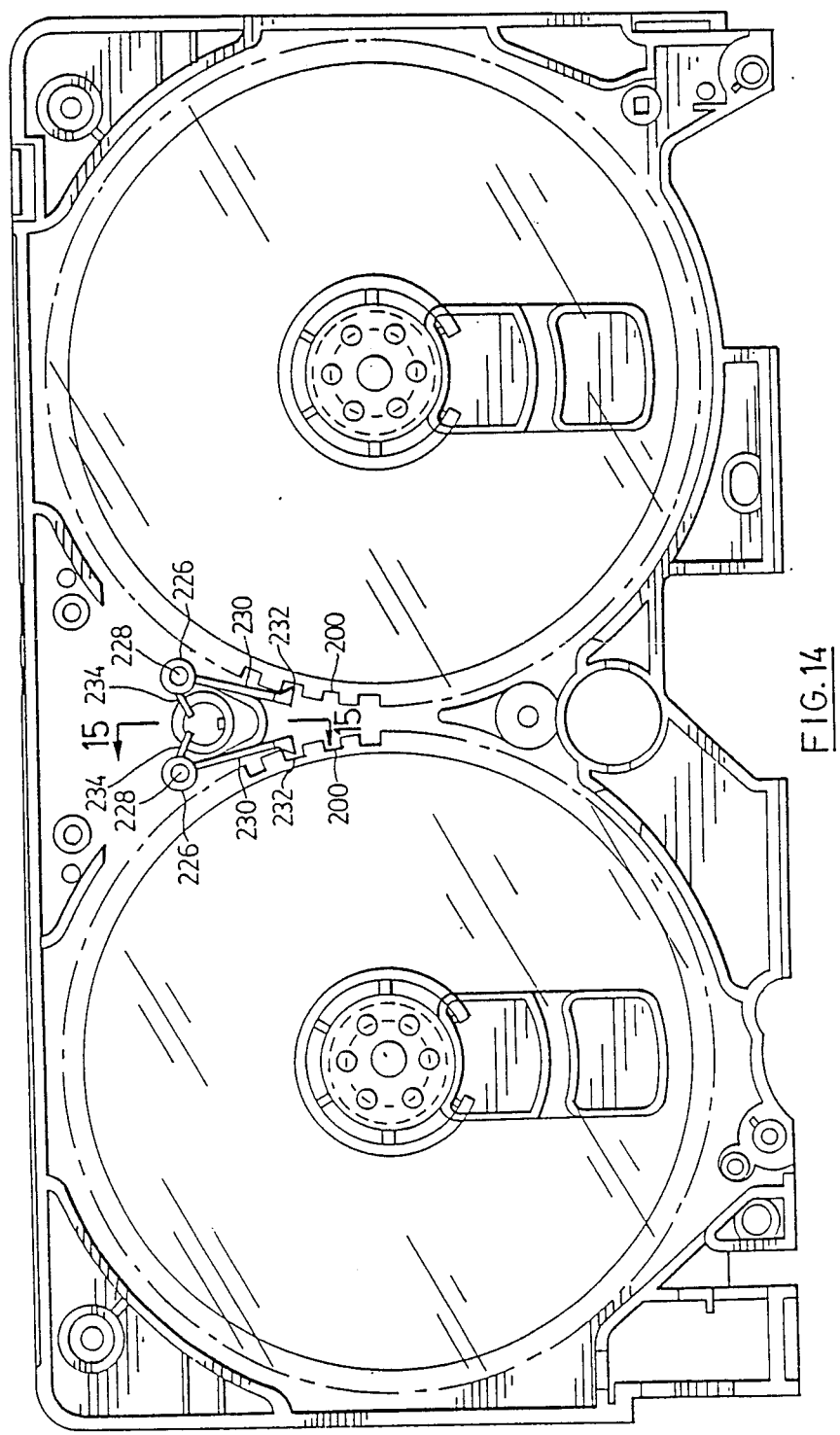
Figure 15:
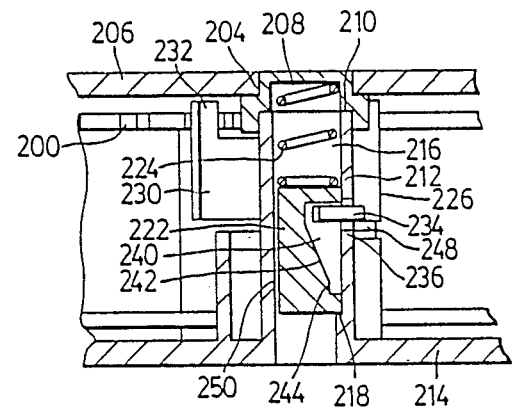
Figure 17:
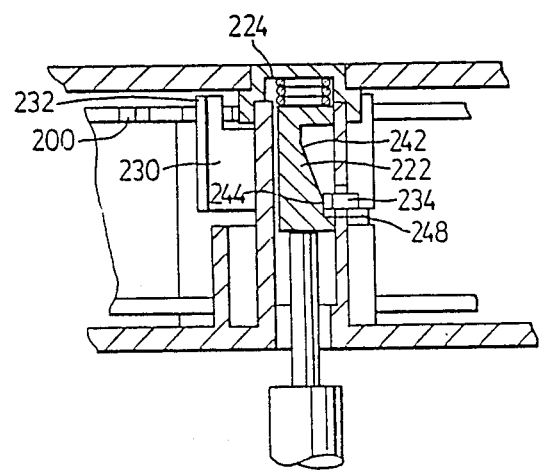

The invention will be more clearly understood after reference to the following detailed specification read in conjunction with the drawings wherein;

FIG. 1 is a plan view of a take-up spool suitable for use in a tape cassette constructed in accordance with an embodiment of the present invention, FIG. 2 is a sectional view taken through the centre of the spool of FIG. 1, FIG. 3 is a plan view of the bottom shell of a cassette constructed in accordance with an embodiment of the present invention, FIG. 4 is a sectional view taken along the line 4—4 of FIG. 3, and includes the top shell of the cassette, FIG. 5 is a plan view of the underside of the locking mechanism illustrated in FIG. 4, FIG. 6 is a front view of a portion of the rewinding mechanism, FIG. 7 is a section view taken along the line 7—7 of FIG. 6, FIG. 8 is a plan view of the lock drive disc which is illustrated in cross-section in FIG. 4, FIG. 9 is a plan view illustrating one of the arm segments of the locking lever assembly which is illustrated in FIG. 3, FIG. 10 is a plan view similar to FIG. 9 showing the other of the arm segments of the arm locking lever assembly, FIG. 11 is a plan view of a spool similar to that illustrated in FIG. 1 which incorporates a torque limiting clutch, FIG. 12 is a front view of the clutch plate which is incorporated into the hub of the spool of FIG. 11, FIG. 13 is an end view of the clutch plate of FIG. 12, FIG. 14 is a plan view of the bottom shell of a cassette illustrating an improved spool latching mechanism which serves to lock the spools against rotation during shipping and storage, FIG. 15 is sectional view of the latch mechanism taken along the line A—A of FIG. 14, FIG. 16 is a plan view of the bottom shell of a cassette similar to FIG. 14 showing the latching arms in the released position, FIG. 17 is a sectional view taken along the line B-B of FIG. 16.

With reference to FIG. 1 of the drawings, the reference numeral 10 refers generally to a take-up spool. The take-up spool 10 consists of an upper side wall disc 12, a lower side wall disc 14 and a central hub which is generally identified by the reference numeral 16. The central hub 16 has an outer cylindrical portion 18 which functions as a winding drum on which the tape which is to be supported on the spool 10 is wound. A plurality of ribs 20 extends between the outer cylindrical portion 18 and an intermediate cylindrical portion 22. The intermediate cylindrical portion 22 is formed with a top wall 24 which has a projection 26 and a plurality of studs 25 which extends through an opening 28 and a plurality of openings 29 in the upper side wall disc 12. A hub insert 30 is mounted in the intermediate cylindrical portion 22 and is formed with a plurality of longitudinally extending ribs 32 which are arranged to engage the spindle of the drive shaft. A circular retaining ring 34 serves to connect the intermediate cylindrical portion and hub insert 30 in the interlocked configuration shown in FIG. 2. As shown more clearly in FIG. 11 of the drawings, a conventional tape anchor 19 is provided for the purposes of attaching the leader tape (not shown) to the central hub 16. The tape anchor 19 is proportioned to fit in a close fitting relationship within the slot 19b which is formed in the central hub 16.

Because some VCR's which are presently on the market employ a machine logic which operates to automatically rewind a tape when the end of the tape is sensed and this logic must be accommodated, we provide a torque limiting clutch which will operate to effectively disguise the fact that the tape has been fully unwound onto the take-up spool. In order to provide a torque limiting clutch, a second insert 17 is located in a notch 17a which is formed in the outer cylindrical portion 18 of the central hub 16. A resilient detent in the form of a leaf spring 21 is mounted on the insert 17 and projects therefrom. As shown in FIG. 11 of the drawings, when the insert 17 is located in the notch 17a, the leaf spring 21 will extend into one of the notches 31 which is formed in the hub insert 30 of the central hub 16. Consequently, the leaf spring 21 forms the drive coupling between the central hub 16 and the hub insert 30. If the central hub 16 cannot rotate because of an end of tape condition, the leaf spring 21 can be deflected so as to be displaced out of successive notches 31 to permit the hub insert 30 to be rotatably driven by the motor which drives the take-up spool. The amount of torque that can be transmitted through the hub insert 30 is determined by the degree of flexibility of the leaf spring 21.

To further assist in overcoming the problems encountered when using a cassette of the type of the present invention which does not permit the user to rewind the tape in conjunction with a VCR which incorporates an automatic rewind system, we replace the transparent leader which is customarily used to activate the rewind mechanism with a heavy leader. The conventional leader normally has a thickness of about 0.001" whereas the leader which we prefer to use has a thickness of about 0.005" to 0.010" and a length of 3' to 4'. We also block off the citing passages which permit the light which is emitted by the VCR to pass through the conventional transparent leader to a sensor which activates the rewind cycle. By using a heavier leader, the load which is applied to the take-up spool as the leader is unwound increases substantially and this serves to reduce the rotational speed of the spool and this in turn reduces the jarring effect on the mechanism when the tape is fully unwound. By damping in this manner, the likelihood of damage to the leader is greatly reduced and by using a heavy leader this problem is further reduced.

An engagement disc 38 is connected to the spool 10 by means of a one-way coupling which is generally identified by the reference numeral 40. The one-way coupling 40 consists of a locking ring 42 which is formed with an annular groove 44 in which the inner edge of the lower side wall disc 14 is mounted and held fast. The locking ring 42 has a flange 46 which projects radially outwardly from its lower edge. A roller cage 48 is mounted on the disc 38 and extends circumferentially around the ring 42 in a spaced relationship thereto. The roller cage 48 has a flange 50 which extends radially inwardly thereof and rests upon the flange 46. A plurality of recesses 52 (FIG. 1) are formed at circumferentially spaced intervals around the roller cage 48. Each recess 52 has a lip portion 53 which cooperates with the flange 46 to form a bottom wall. Each recess also has a ramp face 54 which is inclined inwardly toward the inner ring 42. A roller 56 is located in each recess 52 and is proportioned so as to be freely rotatable when located in the large end of the recess 52 and to act as a wedge which will serve to secure the locking ring 42 against rotation with respect to the roller cage 48 when located toward the narrow end of the recess 52. The roller cage 48 is mounted on and secured against rotation with respect to the engagement disc 38. It follows that if the engagement disc 38 is held against rotation, the one-way coupling 40 will permit rotation of the spool in the direction of the arrow A (FIG. 1) while preventing rotation in the direction of the arrow B. If, however, the engagement disc 38 is free to rotate, the entire assembly of spool 10 and engagement disc 38 may rotate freely in the direction of the arrow A or in the direction of the arrow B.

It will be noted that no provision is made for moving the roller 56 to and fro between the released position and the wedged position with the result that the one-way coupling serves to operate automatically but cannot be adjusted to permit free rotation of the spool with respect to the engagement disc in the direction of the arrow B. In this respect, the mechanism is significantly different from that of my prior device. The rollers 56 are simple cylindrical shaped rollers which are merely confined by the walls of the recess in which they are located.

As indicated in FIGS. 1 and 2 of the drawings, the diameter of the lower side wall disc 14 is substantially less than the diameter of the engagement disc such that a marginal edge portion 38a of the engagement disc will project beyond the outer edge of the disc 14. A plurality of notches 60 are formed in the marginal edge portion 38a and extend radially inwardly. The notches 60 function as locking openings in the peripheral edge portion 38a as will be described hereinafter.

With reference to FIG. 3 of the drawings, the reference numeral 62 refers generally to a tape cassette housing constructed in accordance with an embodiment of the present invention. In this housing, two circular-shaped spool mounting compartments 64 and 66 are located in a side-by-side relationship. The cassette has a front edge 68 along which a tape is guided as it is transferred from one spool to the other and a back edge 70 which extends parallel to the front edge and tangentially with respect to the spool mounting compartments. The spool mounting compartments have side wall portions 72 and 74 which converge in a direction away from the back edge 70 of the housing and are connected to one another at their inner end. A third compartment 76 is formed between the back edge 70 and the side wall portions 72 and 74. This third compartment serves to accommodate the locking mechanism which is generally identified by the reference numeral 80. An opening 78 is formed in the side wall 72 to provide access to the compartment 64.

As shown in FIG. 4 of the drawings, access to the locking mechanism 80 is achieved through a passage 84 which is formed in the bottom wall 86 of the tape cassette 62.

The locking mechanism 80 is in the form of a rotory combination lock which has a central post 88 which is formed integrally with the top wall 90 of the cassette housing 62 and has a concentric hole 89. Two lock discs 92 and 94 and a lock drive disc 96 are mounted for rotation on the shaft 88. Spacers 98 and 100 consist of an annular ring with an internal tongue 99 (FIG. 8). The tongue 99 locates in groove 101 of central post 80 (FIG. 4) and prevents rotation of the spacer about axis of central post 88. Spacers 98 and 100 serve to provide narrow gaps between adjacent lock discs and to prevent rotation by friction between lock drive disc 96 and lock disc 94 and between lock discs 94 and 92. A pin 102 projects downwardly from the lock disc 92 and a pin 104 projects upwardly from the lock disc 94. A pin 106 projects downwardly from the lock disc 94 and the pin 108 projects upwardly from the lock drive disc 96. A radially extending slot 112 is formed on the bottom face of lock drive disc 96. A compression spring 114 bears against the top wall 90 and the lock disc 92 and serves to maintain the discs in the position shown in FIG. 4. As will be described hereinafter, a drive head is located beneath lock drive disc 96 and a drive pin extends into the slot 112. When the drive head is rotatably driven in a first direction, it will drive the lock drive disc 96 until the pin 108 strikes the pin 106 and thereafter both lock drive disc 96 and lock disc 94 will be rotatably driven and when the pin 104 contacts the pin 102, all three discs will be rotatably driven.

As shown in FIG. 3 of the drawings, the lock disc 92 has a slot 116 which extends radially inwardly from its peripheral edge. The lock disc 94 has a slot 118 and the lock drive disc 96 has a slot 120 which also extends radially inwardly. The slot 120 and the lock drive disc 96 has a side edge 122 which forms a ramp which serves to unseat the locking pin as will be described hereinafter.

A locking lever arm 124 is provided for the purposes of releaseably locking the engagement disc 38 against rotation. The locking lever arm is illustrated in FIGS. 4, 9 and 10 of the drawings to which reference is now made. The locking lever arm 124 consists of two pivot arms 125 and 127 which are arranged one above the other and pivotally mounted on the shaft 126. A finger 130 is formed on the arm 125 and is arranged to project laterally toward the engagement disc 38 so as to extend into a notch 60 as shown in FIG. 3 of the drawings in use. A torsion spring 134 extends around the shaft 126 and has one end bearing against the lever arm 125 and its other end bearing against the pin 136 which is formed integrally with the housing.

The locking lever arm 127 is also pivotally mounted on the shaft 126 and has a locking pin 132 mounted on one end thereof which extends vertically downwardly therefrom. The locking pin 132 is proportioned to fit within each of the notches 116, 118 and 120 of the locking discs. A small torsion spring 135 extends around the shaft 126 and has one end bearing against the lever arm 127 and its other end bearing against the pin 136. The biasing springs 134 and 135 are arranged to operate in opposite directions. The spring 135 urges the lever arm 127 toward the lock discs and the spring 134 urges the arm 125 toward the edge of the spool. The torsion spring 135 is, however, substantially stronger than the torsion spring 134 with the result that in the condition where the pin 132 is aligned with the notches of the lock discs, the arm 127, the spring 135, will act to overcome the spring 134 to move the arm 125 away from the spools. The arm 125 has a small lug 129 which projects upwardly therefrom and is located in an outwardly overlying relationship with respect to the radially extending portion of the arm 127 (FIG. 4).

In use, when the drive head is operably positioned as will be described hereinafter and rotatably driven, it will initially be powered so that it rotatably drives the lock discs in a counter-clockwise direction from the position shown in FIG. 3 of the drawing to engage the entire disc stack as described previously. After sufficient rotation in this counter-clockwise direction, the unlocking mechanism will, as will be described hereinafter, index the disc stack to an index point common to the cassette 62 and lock release mechanism 144, and will then initiate the unlocking procedure after receiving unlocking directions from unlock code by causing lock disc 92 to be driven to the position where its slot 116 is aligned with the locking pin 132. The direction of rotation of the drive head will then be reversed. As a result, the pin 104 will move away from the pin 102 and the upward lock disc 98 will remain stationary while the lock disc 94 will be rotated until its slot 118 is aligned with the locking pin 132. This procedure will then be repeated by again reversing the direction of rotation of the drive head so that the drive head will serve to move the lock drive disc 96 while the lock discs 92 and 94 remain in the aligned position. The lock drive disc will then be positioned with its slot 120 aligned with the locking pin 132 at which time the locking pin 132 will move inwardly of the aligned slots of the lock discs under the influence of the spring 134. This will simultaneously cause the finger 130 to be withdrawn from the notch 60 of the engagement disc, thus releasing the engagement disc 38 for free rotation to permit rewinding of the spool.

The rewinding mechanism which is generally identified by the reference numeral 140 in FIGS. 6 and 7, includes a spool drive mechanism 142 and a lock release mechanism 144. The spool drive mechanism 142 is constructed so as to be the same as that illustrated in my prior U.S. Pat. No. 4,632,335 dated Dec. 30, 1986. This mechanism includes a drive shaft 146 which is driven by a motor 148 through a coupling 150 and a gear train 152. The driven head 154 is adapted to fit within the free-fitting spool of the cassette in a conventional manner. The head 156 which is mounted on the post 158 is a follower which is mounted for free rotation about its longitudinal axis.

The spool drive mechanism 142 and the lock release mechanism 144 are each supported on a platform 160.

The power source for the lack release mechanism 140 is a reversable DC stepper motor 162 which has an output shaft 164. A disc 166 is mounted for rotation with the shaft 164. The outer peripheral edge of the disc 166 passes through a slot 168 which is formed in a visual sensor device 170. A radial slot (not shown) is cut in to the marginal edge of the disc 166 and the presence of this slot is detected by the sensor 170. A gear wheel 172 is also mounted for rotation with the shaft 164 and meshes with a gear wheel 174 which is mounted on the drive shaft 176 of the lock release mechanism. A further disc 178 is mounted on the drive shaft 174 for rotation therewith. The marginal edge portion of the disc 178 extends into the slot 180 which is formed in the second visual sensor 182. Again, a visually identifiable slot is cut in to the marginal edge of the disc 178 and the passage of this slot through the notch 180 is detected by the sensor 182. The lock drive head is in the form of a cylindrical shaped head member 184 which is mounted on the upper end of the drive shaft 176. The head portion 184 has a shoulder 186 and the shaft 176 has a shoulder 188 which is located opposite the shoulder 186. A compression spring 190 is located between the shoulders 186 and 188 and normally serves to urge the head portion to an elevated position with respect to the shaft 176. A pin 192 extends through the shaft 176 and the head portion 184 and serves to connect the head portion 184 to the shaft 176 for rotation therewith. The pin 192 is mounted in a slot 191 which extends longitudinally of the head 184 so as to permit the longitudinal movement of the head 184 with respect to the shaft 176. A retaining ring 193 serves to limit the upward motion of the drive head 184. A visually detectable band 194 is formed on the outer face of the head 184 and extends circumferentially thereof. A third visual sensor 198 is mounted on a support platform 199 and serves to generate a signal which indicates when the band 194 is aligned with the visual sensor thereby indicating that the head 184 is operably positioned for the purposes of rotatably driving the combination lock. The head 184 has a drive pin 196 which is arranged to project into the radial slot 112 of the lock drive disc 96.

In use, the cassette which is to be rewound is positioned with the take-up spool 10 mounted on the head 156 and the supply spool, which is to be driven in the rewind direction A, is mounted on the driven head 154. When the cassette is mounted on the rewind mechanism in this manner, the axis of the drive shaft 176 of the lock release mechanism 144 will be aligned with the axis of the locking mechanism 80 by means of a recess 89 of which is formed in the central post 88 centering itself on drive shaft 176. If the drive pin 196 of the head 184 is not aligned with the slot 112, the head 184 will be forced downward to compress the spring 190. The stepper motor 162 is then activated to rotatably drive the drive shaft 176 through the gears 172 and 174. When the drive pin 197 is aligned with the slot 112, it will enter the slot 112 and the head 184 will be raised by the compression spring 190. The sensor 196 will generate a signal indicating the engagement of the lock drive disc 96 and the head 184 when the head is arranged so that the visually detectable band 194 can be detected by the sensor 196. The drive shaft 176 is now coupled to the lock drive disc 96 of the lock mechanism. Further rotation of the shaft 176 will occur in the counter-clockwise direction when viewed in the position shown in FIG. 3. This counter-clockwise rotation will continue until the sensors 170 and 182 detect the arrival of the slot (not shown) which is formed in each disc 166 and 178. The detectors will then generate signals which serve to indicate the angular position of the locking finger 197 with respect to the longitudinal axis of the shaft 176. This signal is then interpreted by the control system (not shown) to align the drive head and disc stack with an index position which is common to the lock mechanism 80 and the lock release mechanism 144.

Once indexed, the stepper motor 162 will continue to rotatably drive the engaged disc stack for a number of motor steps corresponding to first number in the unlock code from the index point at which the slot 116 of the lock disc 192 is aligned with the locking pin 132. The direction of rotation of the step motor is now reversed and it will operate to drive the shaft 176 in a clockwise direction, a number of motor steps corresponding to the second number in the unlock code. As a result, the lock drive disc 96 will initially be driven in the clockwise direction while the lock discs 94 and 92 will remain stationary. When the pin 108 which is carried by the lock drive disc 96 engages the pin 106 of the lock disc 94, the lock disc 94 will be driven in the clockwise direction at which point, after the motor has finished performing the number of steps required, slot 118 of the lock disc 94 is aligned with the locking pin 132. The direction of the stepper motor is again reversed and performs a number of motor steps corresponding to the third number of the unlock code at which point the slot 120 of the lock drive disc 96 is aligned with the locking pin 132 at which point the locking pin 132 will enter the slots the locking disc stack and thereby remove the finger 132 from the notch 60 the spool 10. Thereupon, the drive motor 148 is activated to rotatably drive the driven head 154 to rewind the tape from the spool 10 onto the supply spool. Once the rewinding of the tape has been completed, the stepper motor 162 is again activated to rotatably drive the drive shaft in the counter-clockwise direction. Rotation in this direction will cause the ramp surface 122 of the notch 120 to unseat the locking pin 132 to drive locking lever arm 124 towards the engagement disc 38. If notch 60 is in proper alignment finger 130 will enter notch 60 and lock the engagement disc 38. If the notch 60 is not aligned with the finger 130, the movement of the finger 130 will be interrupted when it makes contact with the disc. This will not, however, prevent the pivot arm 127 from performing its full range of movement. Once an attempt is made to drive the spool 10 in the direction of the arrow B of FIG. 1, by the nature of the one-way coupling, notch 60 will be driven until it is aligned with the finger 130 at which point the torsion spring 133 will be effective to cause the finger 130 to enter the notch and thus lock the engagement disc against rotational movement. When the engagement disc is locked, any attempt to rotatably drive the spool 10 in the direction required for rewinding will cause the rollers 56 of the one-way coupling 40 to become wedged between the inner ring 42 and the ramp 54 of their recess 52 which will effectively secure the engagement disc 38 to the ring 42 and thereby prevent rotation of the spool 10 in the rewind direction.

From the foregoing, it will be apparent that the structure of the spool 10 has been simplified in that it does not incorporate a one-way coupling mechanism which functions as a clutch and which must be released to permit rewinding. The component which is locked in order to prevent rewinding is the engagement disc and this disc in combination with the one-way coupling 42 provides a controlled access rewinding system in a spool of a relatively simple construction.

The unlocking mechanism is of a relatively simple construction which is capable of accommodating various different combinations.

Various modifications of the structure described above will be apparent to those skilled in the art. For example, it will be understood that the number of discs which are used in the locking mechanism need not necessarily be limited to three. In addition, the number of pins in each disc need not be limited to two. It would also be apparent that the initial direction of rotation of the locking mechanism need not be in the counter-clockwise direction. The initial direction depends on the number of discs in the stack and the direction of the ramp formed on the locking drive disc.

It will also be apparent that the tape cassette of the present invention can be operated as a normal cassette which will permit rewinding as required merely by leaving the locking mechanism in the unlock position. In this position, the engagement mechanism is always free to rotate. The engagement mechanisms is not capable of operating in locking the mode unless the locking mechanism is located in the lock position.

The spool locking mechanism which is used for the purposes or temporarily locking the spools during snipping and handling is illustrated in FIGS. 14 to 17 of the drawings to which reference is now made.

As shown in FIGS. 14 and 16 or the drawings a plurality of notches 200 are formed at spaced intervals about the peripheral edge or the upper side wall 12. As shown in FIG. 15 or the drawings, a cap 202 is mounted in a passage 204 which is formed in the top wall 206 or the housing or the cassette. The cap 202 is formed with a recess 208 which has a shoulder portion 210 extending radially thereof. A hollow column 212 which is formed integrally with the wall 214 of the lower cassette housing segment has its upper and bearing against the shoulder 210. The column 212 is formed with a slide passage 216 which has a shoulder 218 at its lower end. The slide passage 216 opens through the bottom wall of the cassette at lower end of the column 212. A slice member 222 is slidably mounted in the chamber 216 and a compression spring 224 normally urges the slide member 222 to the position in which it bears agains the shoulder 218 as shown in FIG. 15. A longitudinally extending slot 250 is formed in the slide member 222 into which a tongue 252 which is formed on the inner wall of the hollow column 212 extends. This tongue and slot serve to permit longitudinal movement of the slide member 222 while preventing rotation of the slide member 222.

As shown in FIG. 15 of the drawings, a pair of latching members 226 are mounted on posts 228. The latching members 226 have latching arm 230 extending radially therefrom which has a tooth 232 at the outer end thereof. As shown in FIG. 14 of the drawings, the teeth 232 are proportioned and arranged to extend into the notches 200 to lock the spools against rotation. The latching members 226 also have actuator arms 234 which extend radially outwardly therefrom. The actuator arms 234 extend through a passage 236 which is formed in the side wall of the column 212 into the path of travel of the slide member.

As shown in FIG. 15 of the drawings, the slide member 212 is formed with a recess 240 which has an angularly inclined ramp face 242 which extends inwardly and upwardly from a shoulder 244 which is located at the lower end of the recess 240.

In order to withdraw the teeth 232 from the passages 200 to assume the position shown in FIG. 16 of the drawings, the slide member 222 is elevated to the position shown in FIG. 17 by means of a rod 246 which is commonly provided in existing VCR equipment for the purposes of raising the corresponding slide member previously used. As shown in FIG. 17, when the slide member 22 is elevated, the arms 234 will be deflected by contact with the ramp face 242 and will eventually assume a position bearing against the shoulder 244. The shoulder 244 forms a rigid stop which limits the inward movement of the arms 234 in a manner which provides a more stable support than that which would be provided by the inclined ramp face 242. When the arm 234 is deflected in this manner, the arm 230 will also be deflected and will assume the position shown in FIG. 16 wherein the teeth 232 are withdrawn from the notch 200. Under these conditions, the spools are released by the spool locking mechanism. When the rod 246 is lowered, the slide member 222 will be deflected downwardly by the compression spring 224 and this downward movement will permit the arms 234 to move inwardly under the influence of a torsion spring 248 which is wound around its associated post 228 and has one end bearing against the arm 230 and its other end held fast against the column 212 so that it normally urges the arms 230 and 234 to the position shown in FIGS. 14 and 15 of the drawings.

We claim:

1. In a tape cassette having a housing and a pair of spools located in the housing, a first of said spools being a take-up spool which is mounted in the housing for rotation about its axis in a first direction to wind and a second direction to unwind a tape or the like from or onto the other spool, the improvement of;
   (a) an engagement member mounted in the housing for rotation about the axis of the take-up spool,
   (b) one-way coupling means arranged to communicate between the engagement member and the take-up spool, said coupling means engaging automatically to prevent rotation of the spool relative to the engagement member in the unwinding direction and releasing automatically to permit free rotation of the spool relative to the engagement member in the winding direction,
   (c) locking means in said housing, said locking means being operable to engage said engagement member to secure it against rotation about the axis of the take-up spool and thereby prevent rotation of the take-up spool as a result of the automatic engagement of the coupling when an attempt is made to rotate the take-up spool relative to the engagement member in the unwinding direction and to disengage the engagement member to permit free rotation of the engagement member and spool about its second axis to allow the spool to be rewound.

2. A cassette as claimed in claim 1, wherein the lock means is a key-operated lock.

3. A cassette means as claimed in claim 1, wherein the lock means is a key-operated combination lock.

4. A cassette as claimed in claim 1, wherein said engagement member comprises an engagement disc in which a locking opening is formed, said locking means comprising a detent mounted for movement into and out of the locking opening and a locking mechanism which is operable to move the detent member into and out of the locking opening.

5. A cassette as claimed in claim 4, wherein the take-up spool comprises an upper side wall disc, a lower side wall disc and a central hub, the lower side wall disc having a diameter which is less than that of the engagement disc such that a peripheral edge portion of the engagement disc projects radially outwardly from the edge of the lower side wall disc, said locking opening being in the form of a notch which extends inwardly from the peripheral edge of the brake disc into the peripheral edge portion thereof.

6. A tape cassette as claimed in claim 1, wherein the clutch means is in the form of a roller coupling.

7. A tape cassette as claimed in claim 1, wherein said spool locating compartments are circular in shape and are located in the housing in a side-by-side relationship, the cassette having a front edge along which the tape is guided as it is transferred from one spool to the other and a back edge which extends parallel to the front edge and tangentially with respect to the spool mounting compartments, the spool locating compartments having side wall portions which converge in a direction away from the back edge of the housing, the improvement of;
   (a) a third compartment located between the back edge of the cassette and said converging side wall portions of the spool mounting compartments,
   (b) a locking passage opening from said third compartment through a first of said converging side wall portions into the spool mounting compartment in which the rewind spool is located, said locking means being mounted in said third compartment and having a detent which is mounted for movement through said locking passage into and out of engagement with said brake member.

8. In a tape cassette of the type having a housing, a pair of spool locating compartments located in the housing in a side-by-side relationship and a third compartment located between the converging sides of the spool compartments and an adjacent side wall of the housing, the width of the third compartment decreases progressively to a narrow inner end which is located between the spools, each spool having an upper and lower circular side wall located adjacent the upper and lower walls of the housing respectively, the improvement of;
   a spool locking mechanism comprising:
   (a) a plurality of notches formed in the outer peripheral edge of the upper side wall of each spool at circumferentially spaced intervals,
   (b) a slide member slidably mounted in said third compartment for movement along a guide path between a lowered position and a raised position with respect to the bottom wall of the housing, said guide path being spaced outwardly from said narrow inner end of the third compartment,
   (c) a pair of latching arms, arranged one on either side of said slide member, one latching arm being associated with each spool, each latching arm being pivotally mounted in said third compartment and extending inwardly from its pivot toward the inner end of the third compartment in a compact array such that a substantial portion of the third compartment which is located between the spool locking mechanism and said side wall is unoccupied by the spool locking mechanism and is available for other mechanisms, each latching arm being mounted for movement of its distal end between a first position in which it is seated in a notch of its associated spool to lock the spool against rotation and a second position in which it is out of engagement with its associated spool,
   (d) an actuator lever arm projecting from each latching arm toward said slide member, said actuator lever arms being attached to latching arms for movement therewith between first and second positions in response to movement of the latching arms between their first and second positions, said actuator lever arms extending into said guide path,
   (e) a ramp face on said slide member, said ramp face being arranged to engage said actuator lever arms as said slide member is driven to and fro between said lowered position and said raised position to move said actuator lever arms to and fro between their first and second positions and thereby moving their associated latching arms to and fro between their first and second positions to latch their associated spool against rotation and to release their associated spool for rotation as required in use.

* * * * *